United States Patent [19]

De Longhi

[11] Patent Number: 5,027,697
[45] Date of Patent: * Jul. 2, 1991

[54] ROTATING OBLIQUE BASKET FRIER FOR CYCLIC IMMERSION COOKING

[75] Inventor: Giuseppe De Longhi, Treviso, Italy

[73] Assignee: De Longhi s.p.a., Treviso, Italy

[*] Notice: The portion of the term of this patent subsequent to Feb. 20, 2007 has been disclaimed.

[21] Appl. No.: 541,090

[22] Filed: Jun. 20, 1990

Related U.S. Application Data

[60] Continuation of Ser. No. 428,053, Oct. 25, 1989, abandoned, which is a division of Ser. No. 101,446, Sep. 28, 1987, Pat. No. 4,901,633.

[30] Foreign Application Priority Data

Oct. 3, 1986 [IT] Italy ................. 59446 B/86

[51] Int. Cl.⁵ .................................. A47J 37/12
[52] U.S. Cl. ............................... 99/409; 99/348; 99/410
[58] Field of Search ............... 99/340, 348, 330, 339, 99/403–411, 425–427; 219/389, 214, 405, 411, 438; 366/239, 240, 216

[56] References Cited

U.S. PATENT DOCUMENTS

| | | | |
|---|---|---|---|
| 1,599,805 | 9/1926 | Barsam | 99/409 |
| 1,789,428 | 1/1931 | Deschenes et al. | 99/409 |
| 3,618,587 | 11/1971 | Lee, Sr. | 99/348 |
| 3,718,485 | 2/1973 | Lankford | 99/410 |
| 4,203,357 | 5/1980 | Vaussanvin | 99/340 |
| 4,238,997 | 12/1980 | Hengstenberg | 99/483 |
| 4,250,803 | 2/1981 | Wohlfart | 99/409 |
| 4,685,386 | 8/1987 | Bezon | 99/409 |

*Primary Examiner*—Timothy F. Simone
*Attorney, Agent, or Firm*—Rosen, Dainow & Jacobs

[57] ABSTRACT

A deep fryer apparatus particularly suitable to home use with a rotatable basket rotating within tray. Both the basket and the tray can be removed from a fixed tray within the housing. The axis of rotation of the basket is greatly inclined with respect to an oil bath contained in tray, so that the food contained in the basket is cyclically and progressively immersed in the oil bath. The bath is heated by adequate heaters, and the apparatus is monitored by control devices.

The new deep fryer features high overall performance and low operating costs. This is due in particular to the small quantity of oil needed to form the oil bath, which is about one-half what is generally necessary, and to the reduced cooking time required as a result of the progressive and repeated elimination of food moisture.

6 Claims, 3 Drawing Sheets

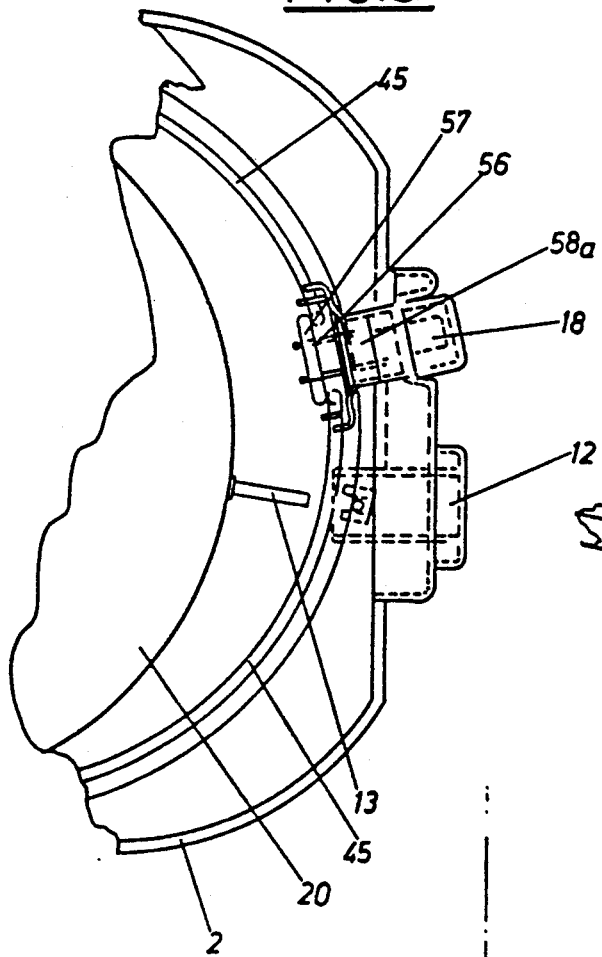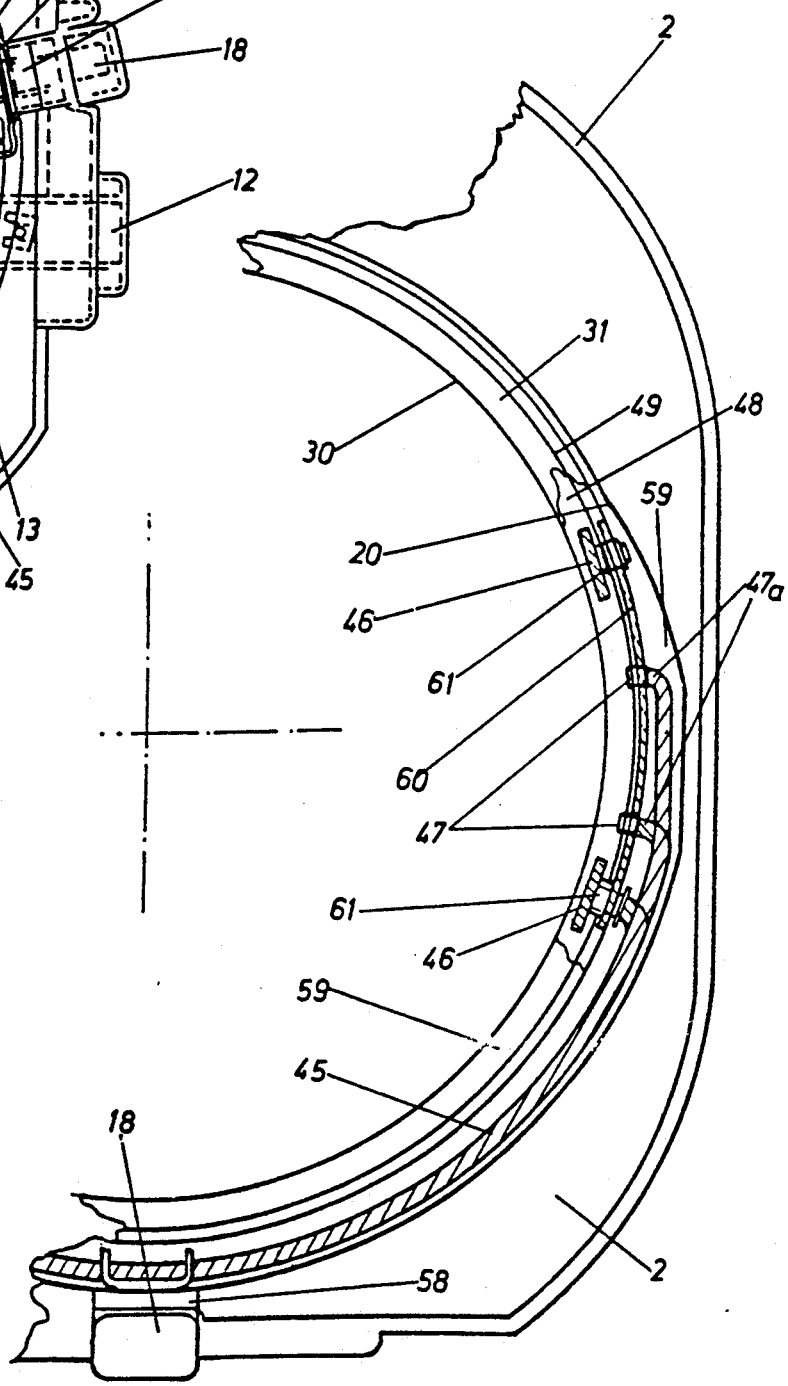

ROTATING OBLIQUE BASKET FRIER FOR CYCLIC IMMERSION COOKING

This application is a continuation of application Ser. No. 428,053 filed Oct. 25, 1989, is a division, of application Ser. No. 101,446, filed 9/28/87, U.S. Pat. No. 4,901,663.

This invention consists of a rotating-oblique-basket frier for cyclic immersion cooking. The structural and operating components of the frier are inter-related to the basket (whose axis is greatly inclined with respect to the cooking oil bath surface plane, which is itself contained into equivalent-position containers) in such a way that all moving parts, connected to the basket by a reduction gear-box, are progressively and cyclically interrupted by an assisted and controlled thermostat.

BACKGROUND OF THE INVENTION

At the present technical stage, all friers produced and xarketed for home use are equipped with vertically-moving baskets only. These types of baskets serve food introduction, extraction and/or draining purposes well, but cannot move during cooking.

However, vertically-moving baskets are inconvenient for a number of reasons.

A first important reason is the high quantity of oil needed for proper cooking, which also means (a) high operating costs due to high power consumption; (b) changing of great quantities of oil due to its exhaustion or to adapt it to the type of food to be cooked.

A second equally important reason is of practical nature, and consists in having to repeatedly move by hand the basket to separate the various food pieces during cooking, which may be rather difficult during the intermediate cooking phases. Furthermore, food cannot be uniformly cooked; the temperature of the oil bath cannot be easily raised; water vapor cannot be freely dispersed; proper cleaning of the oil tray is difficult, even in those cases where the basket can be removed.

SUMMARY OF THE INVENTION

The present invention is an industrially feasible frier which overcomes the above-mentioned shortcomings as follows:

The quantity of oil need for proper cooking is just enough to fill up the lower section of the inclined tray;

The food being fried is cyclically immersed in oil in progressive alternating immersion and emmersions;

During basket rotation, the food elements to be fried are moved and separated This avoids the problem of food particles sticking together, and allows for proper cooking;

The elimination of moisture naturally present in the food is favored and occurs repeatedly during the immersion phases;

The cooking oil bath is stirred by the rotating basket and/or by its contents, as well as by the heat. This accelerates the heat exchange process, especially at the initial stages, and favors uniform operating temperatures;

The rotational velocity of the basket can vary as a function of a preset temperature according to certain parameters, including interruptions of the rotation and others;

The start-up and operating times are greatly reduced;

Oil dripping is incremented, since the upper sections of the inclined basket are oil free;

If necessary, the complete process can be carried out automatically without any operator's intervention.

Moreover, this unit offers the following secondary advantages:

The removal of the frying basket from the oil tray, and vice-versa, is coaxial to the vertical axis of the frier, allowing for proper oil dripping or any other necessary operation;

The frying basket can be controlled with ease during the insertion, cooking and removal phases, and can be as easily handled during the initial and final phases of the cycle;

All components of the frier can easily be disassembled for proper cleaning;

The vapors forming during the cycle or during its complementary phases are exhausted after proper filtering only;

Both the essential and auxiliary components of the frier are at low cost and highly reliable.

Accordingly to the present patent, the advantages described above are best implemented by this new frier by means of the following:

A wire-netted or forged-tin basket bottom shaped so as to (a) filter the cooking oil bath; (b) keep firmly into place the food to be cooked; (c) isolate the food from undesirable residues. The basket is also equipped with clutches for movement and guidance which are juxtaposed to and coaxial with a removable tray containing the basket itself;

The above tray, shaped so as to keep possible residues, fits with the basket or a fixed tray;

At least a motor, connected to the above-mentioned components, with interconnected water-tight parts and with a supporting structure on which the above components are mounted;

Properly tenoned and protected seals in one or more of the above-mentioned components;

At least one, preferably electric, heater to generate adequate heat output;

Adequate interacting or stand-alone support systems to control and regulate all required functions;

Adequate, multi-purpose basket handles for handling the basket when inside or outside the frier. Such handles permit to manually rotate the basket inside the frier while in use;

A system of connected levers which facilitate basket handling and which permit to place the basket in required positions during the cooking and complementary phases;

An interchangeable filtering system housed within the cover;

Interacting cover locking and closing parts, together with circuit breakers for immediate machine stopping, particularly at open cover;

Where needed, basket or tray finning to direct vapor jets towards predetermined locations;

Adequate structural components to contain the abovementioned components or complementary and auxiliary parts constituting the new unit;

Adequate materials which are coordinated and properly shaped, with surface treatments and/or structural treatments as needed;

Materials which are not excessively costly but fully reliable;

Where necessary, structural reinforcements connected with their relative components.

The invention, as it has been described, solves the problems mentioned above for it consists of an oblique-rotating-basket frier for cyclic immersion cooking which is industrially feasible and free of the problems faced by conventional frying units.

The advantages deriving from this invention, as it has been described, can thus be implemented through the construction or this new frying unit.

The frier fulfills home, industrial and other purposes and is characterized by excellent qualities. These qualities consist in the limited quantity of oil needed to form the cooking oil bath (i.e., almost ½ of what is generally need); in the rotating basket, crucial to the quick elimination of food moisture; in the uniformity of the gradual and final mutations; and in the homogeneous heat exchange process.

All these are specific advantages of this innovative system, i.e., an oblique rotating basket greatly inclined with respect to the cooking oil bath, as opposed to systems mounting fixed baskets whose contents are always completely immersed in the oil bath Moreover, considering the small quantities of oil needed to fill the sole lower inclined sections of the oil tray, and considering that the food si cyclically immersed into the oil, this unit is characterized by a number of advantages regarding what type of cooking is needed, the reduction of operating time and the overall performance of the frier.

During bench tests, it has been ascertained that the cyclic and alternating immersions and emersions greatly favor the elimination of food moisture. Moisture elimination, in fact, occurs especially in the upper sections of the rotating basket which are oil-free, and is increased by the stirring action of the iron-knitted basket. This does not occur in conventional frying units, where moisture is eliminated by manually shaking the basket and/or its contents.

The obvious effects of the rotating basket, aside from reducing cooking time, from continuously stirring the oil bath, and from giving a homogeneous oil temperature, are such that the single food pieces undergoing frying are separated, during their immersion, by the action of vapor bubbles developing in the bath, as well as by means of the interactions and counter-pressures occurring between the food surfaces.

DESCRIPTION OF THE DRAWINGS

The invention is described in detail, for illustration purposes, by means of drawings representing one of the possible ways in which the frier will be assembled. The drawings consist of the following:

FIG. 5 shows a partial scaled-down top view of the basket handling device.

FIG. 7 shows a partial top view of the basket guidance and handling device consisting of articulated arms connected to the handle.

FIGS. 1 to 7 represent, in conformity with the present invention, the optimal realization of the oblique-rotating-basket frier for cyclic immersion cooking.

DETAILED DESCRIPTION OF THE PREFERRED EMBODIMENT

Figure 1:
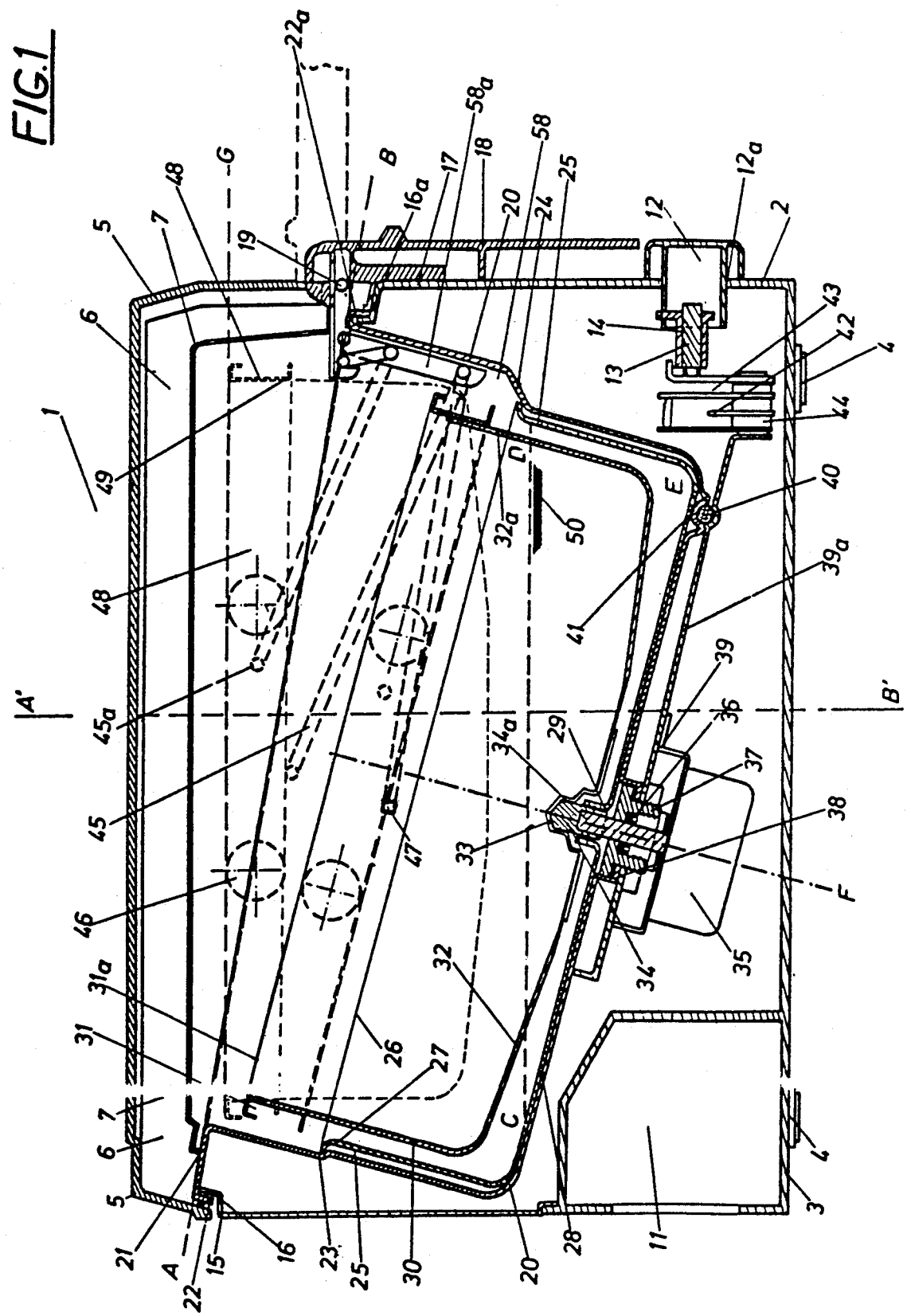
FIG. 1 shows the scaled-down vertical sections A'-B' of the new frier.
Figure 3:
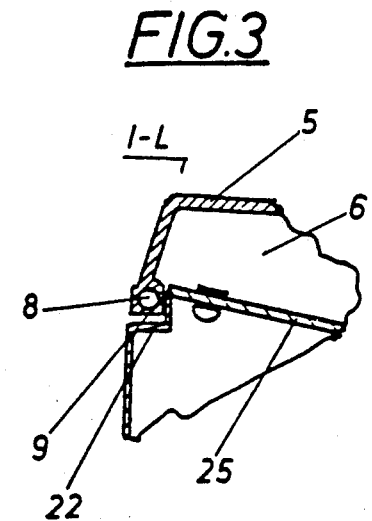
FIG. 3 shows section I-L of the joint elements of the cover.
Figure 4:
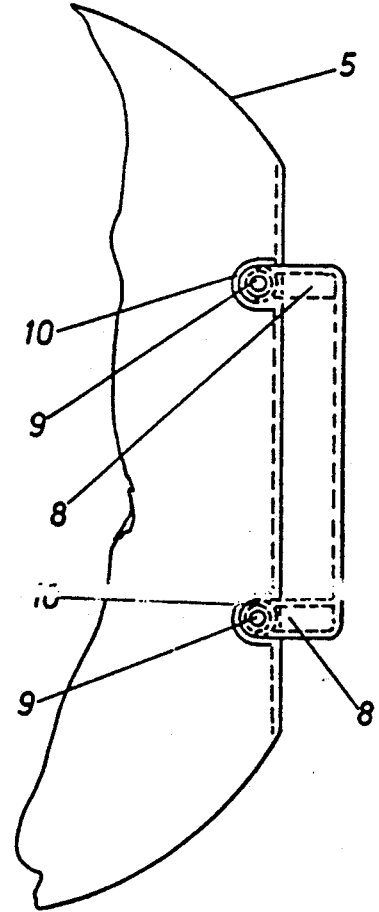
FIG. 4 shows the top view of the components illustrated on FIG. 3.

As shown in FIG. 1, and according to the invention, the unit 1 is essentially constituted by the following operating and structural components:

A streamlined enveloping cover 2, whose bottom 3 rests on the supports 4, complete with a cover 5, with an empty chamber 6 formed between the countercover 7 which hosts a set of filters (not shown here); the cover can move on pivoted 9 hinge 8 installed in their housing 10, as shown on FIGS. 3 and 4.

A structure 2 in conformity with sector 11 (which contains accessories) and with the knobs 12 housings 12a to regulate the thermostat 42 and an optional "timer" 52. The structure is joint to sector 11 by means of tenoned pivots 13 in the jointed cavities 14, as shown in FIGS. 1 and 5.

An upper side of the above-mentioned cover 2, with an oblique profile, indicated by the broken line AB, with the side 15 adjacent to the joint of cover 5, and with form grindings 16 adjacent to the joint of cover 5, and with form grindings 16 coordinated to the equivalent and juxtaposed ones 16a on side 17 near handle 18, hinging on pivot 19, as shown on FIGS. 1 and 3.

Figure 2:
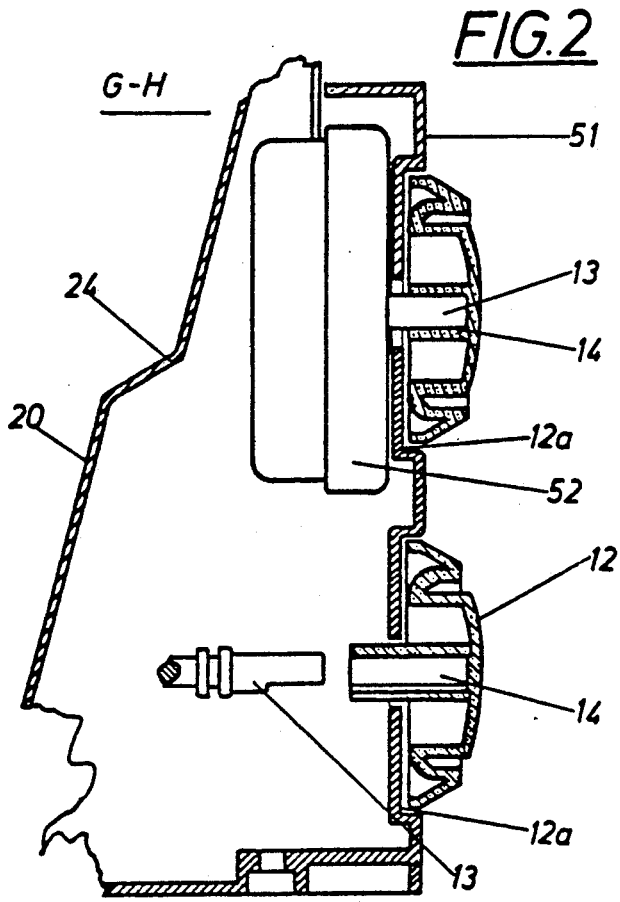
FIG. 2 shows section G-H of the control panel

A tray holder 20, with upper section 21 whose sides 22 and 22a a are molded so as to support 16 and 16a, in structure 2. The tray holder is shaped (22 and 23) so as to support a removable tray 25, as shown in FIGS. 1 and 2.

A removable tray 25, connected to the above-mentioned holder 20, with upper section 26 and sides 27 which can be rested on 23 and 24 in tray holder 20. The removable tray is equipped on its bottom 28 with a central jack 29, as shown on FIG. 1.

A basket 30 constructed of wire-knitted materials, with a side 30 on its mouth 31a and with a bottom 32. The basket is equipped with a shaped plate 33 which can be mounted on pivot 34 connected to the rotating shaft 34a of the motor reduction gear 35. The connection is sealed by 36 which is itself contained into support 37 housed in 38 which lies in the tray holder 20, as shown on FIG. 1.

A motor reduction gear system 35 connected by shaft 39, to the equivalent 39a shaft blocking the electrical resistance 40 mounted in the circular counterhousing 41, itself mounted on the holder 20 and connected to the thermostat 42 (a bimetallic lamels type 43), mounted on the base 44, FIG. 1.

A system connected to the moving handle 18 on hinge 19, of joint levers 45, which envelope 32a the basket and its upper lip 31, with rotating 46 and fixed 47 guide blocks on its upper lip 31 to move freely, as per FIGS. 1 to 7.

An oil both 50, as cooking medium, sufficient to fill sector CDE of the removable tray 25.

Having said the above, the constructive novelty and the basic functions of the unit are shown, in conformity with the invention, on FIG. 1. FIG. 1. shows, on a vertical section, the frier as a whole with its essential structural and operating components 2 to 61, which are coordinated to fulfill the abovementioned purposes. The basket 30, introduced into the tray 25, with an extremely inclined F axis and containing a quantity of adequately heated oil 50 in section CDE, and joint on the rotating pivot 34 by means of connector 33, cooks its contents by rotating, thus carrying out cyclic immersions and emersions.

The low quantity of oil needed is clear, for it is limited to the amounts necessary to fill the sole above-mentioned section. It is also clear how food moisture is eliminated, cycle by cycle, while the food is cooking, without influencing the temperature of the oil bath 50.

Once the frying process is completed, the basket 30 (supported by the articulated arm system 45) is rotated using handle 18 until position G is reached. Once rotated, the oil is drained and the basket removed by means of components 18, 31, 32, 45 to 49 and 60. The introduction of the basket is clear. It is also clear how the removal of tray 25 (carried out by removing it from its housings 23 and 24 and from the plane 29 which sticks out of the fixed container 20) is possible. The temperature of the oil bath 50, heated by at least one electric coil 40, is controlled by thermostat 42, while the cycle is controlled by timer 52. Both the timer and the thermostat can be adjusted by acting on knobs 12.

FIG. 2 shows the section housing the above-mentioned knobs 12 and is placed half-way into the control panel 51. Panel 51 also houses a number of other control knobs, such as those to preset the cycles 52.

FIGS. 3 and 4 show joint 8 of the cover 5 with 6, with components 9 and 10 connected to side 22 and 21 in tray 20. Whereas, FIG. 5 shows one of the uses of device 18, which allows the handling of basket 30, equipped with 58a joining lever 45 by means of parts 56 and 57.

Figure 6:
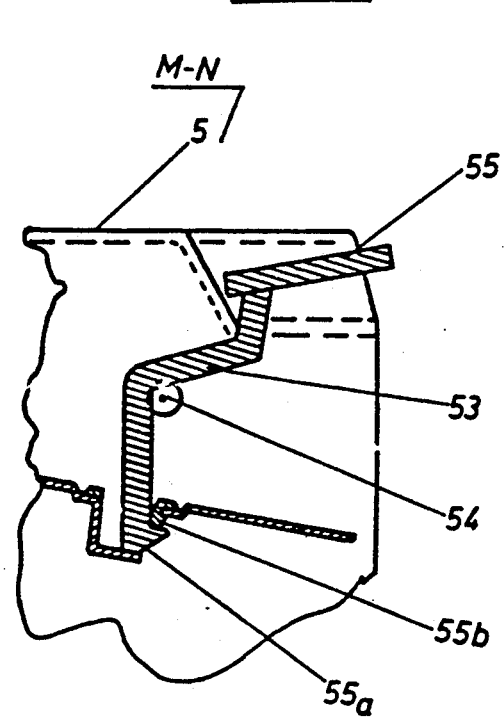
FIG. 6 shows section M-N of the cover closing device.

FIG. 6 shows part 53 (which locks cover 5) hinged on pivot 54 adequately shaped. The function of part 53 is carried out by acting on handling section 55 by first acting on part 55a which hooks on section 55b tried to cover 5.

FIG. 7, a top view, shows a basket 30 guide and lift system connected to handle 18. The system can be tied to pivot 29 as guided by means of lever 58a housed in sector 48, and kept along with its components 31, 45a, 46 to 49 and 61, also shown on FIG. 1.

FIG. 1 shows, on a vertical section A'-B', the fixed container 20 with sector 58a, housing arm 58, which connects and moves articulated lever 45. These can be seen on FIG. 7, which shows one of the side housing 59 adequate to the movements of the levers.

The invention, as it has been described, can be modified and varied according to specific purposes without compromising the performance and characteristics.

As a matter of fact, the new unit is compatible with heaters other than electric ones, e.g. propane heaters used on conventional units. Installation of this new heating equipment necessarily requires small structural changes and adjustments.

The new unit is designed to operate at different speeds and/or interrupted cycles and/or counter-rotations, in order to satisfy various cooking requirements, such as the types of food to be cooked, &heir quality and characteristics, the various kinds of oil used, etc.

The filtering system can be positioned as needed and its functions can be carried out with the assistance of flaps and intakes which can direct steam jets where needed.

The basket, with a sensibly concave or convex bottom, is attached to cylindrically or cone-shaped plating and deflectors which separate heterogeneous foods or contribute to their homogeneity.

To vary the inclination of the operating unit, it is sufficient to adjust a moving device equipped with appropriate handles and stabilizers.

By greatly inclining the operating unit, it is possible to accomplish special tasks such as the rolling of its contents to increase mixing.

These results can be accomplished by utilizing rotating baskets whose axis are parallel to the oil bath and which are equipped with all necessary devices for food loading and unloading, and for their rotation carried out by means of clutches and attachments. They can also be accomplished by utilizing baskets which can be removed by means of handles as described.

The present frier can also be constructed utilizing a basket moving on rollers situated on the sides of the fixed tray. The basket is driven by means of a motor system housed in the cover or by a motorized roller. In this last case, the parts opposite to the roller would serve as guides and supports to the baskets. The above-mentioned basket, which can accommodate another smaller basket within it, can be constructed in solid metal to allow for special cooking tasks, such as the so-called "waterbath" treatments.

By adding to the countercover an adequately shaped piece, it will be possible to increase food mixing.

For the so-called "waterbath" food treatments, as in the case of swelling cereals, it is possible to introduce a basket similar to those described above, within an outer basket. In this way, the cereals are just lapped by the oil bath and swell within the internal basket.

Clearly, the above-mentioned system may also be disregarded. If disregarded, the food may be introduced directly into the outer basket. A rotating, bladed shaft then mixes the food contents in the outer basket during cooking The basket can be independent from its handle, and can be grasped and handled within the oil bath as needed.

Safety devices can also be installed as part of the accessory components of the unit. These devices may be inter-related with a number of parameters and devices (e.g. with some of the above-mentioned systems or with predetermined temperature levels of the oil bath, etc.), so as to automatically open the frier cover, rotate and/or handle the basket, etc. These safety devices may include check lights or acoustic signals which interact with the operations of the unit indicating oil temperature and various unit functions.

The advantages of this innovative unit, specially designed particularly for home use, can thus be appreciated through a careful study of the above description.

All construction details shown and described here, including all essential or accessory components and parts, may be replaced with technically equivalent components and parts.

During bench tests and prototype construction, we have ascertained that the materials and components employed are adequate to all above-mentioned intents and purposes.

All rights for the present unit, as specified in the following claims, are reserved for the entire duration of the patent.

What is claimed is:

1. A deep fryer, operable with a quantity of oil for cooking a quantity of food, comprising a housing defining a chamber therein for containing said quantity of oil which oil will have a top surface defining a horizontal plane, a perforated basket for holding said quantity of food rotatably mounted in said chamber, the basket being rotatable such that food in any part of the basket is cyclically and repeatedly moved to below and then above said horizontal plane of said oil, drive means in said housing for rotating said basket such that said food can be cyclically immersed and emersed in said oil, and means in said housing for heating said oil in said chamber.

2. A deep fryer, operable with a quantity of oil for cooking a quantity of food, comprising a housing defining a chamber therein for containing said quantity of oil which oil will have a top surface defining a horizontal plane, a perforated basket for holding said quantity of food rotatably mounted in said chamber, the basket being rotatable such that food in any part of the basket is cyclically and repeatedly moved to be below and then above said horizontal plane of said oil, and drive means in said housing for rotating said basket such that said food can be cyclically immersed and emersed in said oil, said basket being rotatably mounted in said chamber with said central axis oblique relative to vertical.

3. A deep fryer, operable with a quantity of oil for cooking a quantity of food, comprising a housing defining a chamber therein for containing said quantity of oil which oil will have a top surface defining a horizontal plane, a perforated basket for holding said quantity of food rotatably mounted in said chamber, the basket being rotatable such that food in any part of the basket is cyclically and repeatedly moved to be below and then above said horizontal plane of said oil, drive means in said housing for rotating said basket such that said food can be cyclically immersed and emersed in said oil, mean sin said housing for heating said oil in said chamber said chamber having a bottom wall and a liquid-sealed rotary coupling extending through said wall with input and output parts below and above said wall respectively, and said drive means comprises an electric motor with an output shaft mounted in said housing below said bottom wall and coupled to said input of said rotary coupling, said output of said rotary coupling being releasably engagable to said basket for rotating same.

4. A deep fryer, operable with a quantity of oil for cooking a quantity of good, comprising a house defining a chamber therein for containing said quantity of oil which oil will have a top surface defining a horizontal plane, a perforated basket for holding said quantity of food rotatably mounted in said chamber, the basket being rotatable such that food in any part of the basket is cyclically and repeatedly moved to be below and then above said horizontal plane of said oil, an drive means in said housing for rotating said basket such that said food can be cyclically immersed and emersed in said oil, said chamber having a bottom wall and a liquid-sealed rotary coupling extending through said wall with input and output parts below and above said wall respectively, and said drive means comprises an electric motor with an output shaft mounted in said housing below said bottom wall and coupled to said input of said rotary coupling, said output of said rotary coupling being realeasably engagable to said basket for rotating same.

5. A deep fryer, operable with a quantity of oil for cooking a quantity of food, comprising a housing defining a chamber, a pan removably positioned in said chamber for containing said quantity of oil which oil will have a top surface defining a horizontal plane, a perforated basket for holding said quantity of food rotatably and removably positioned in said pan, the basket being rotatable such that food in any part of the basket is cyclically and repeatedly moved to be below and then above said horizontal plane of said oil, the basket having a central axis of rotation and being rotatably mounted in said chamber with said central axis oblique relative to vertical, drive means in said housing for rotating said basket such that said food can be cyclically immersed and emersed in said oil, and means for heating said oil in said pan.

6. A deep fryer operable with a quantity of oil, comprising: a housing, a vessel within the housing for containing a quantity of oil which oil defines a horizontal top surface when the apparatus is positioned in upright position, a basket of generally cylindrical shape having a central axis and being positionable in said vessel with said central axis oblique from vertical, said basket adapted to be inserted in and removed from said vessel, said basket being rotatable while in said oblique position, said basket positioned is said vessel such that when said quantity of oil is present in said vessel, a portion of its bottom will be beneath said top surface of the oil and a diametrically opposite portion will be above said top surface of the oil, said basket, as it rotates, having each part of its bottom cyclically immersed and emersed from said oil, drive means in said housing for rotating said basket while in its oblique position, means in said housing for heating said oil in said vessel, and a lid for covering and closing the top of said housing.

* * * * *